June 18, 1929.  J. VOLZ  1,717,748
GRAIN SEPARATOR
Filed Oct. 21, 1925   6 Sheets-Sheet 1

Joseph Volz
INVENTOR
BY Victor J. Evans
ATTORNEY

WITNESS:

June 18, 1929.  J. VOLZ  1,717,748
GRAIN SEPARATOR
Filed Oct. 21, 1925   6 Sheets-Sheet 3
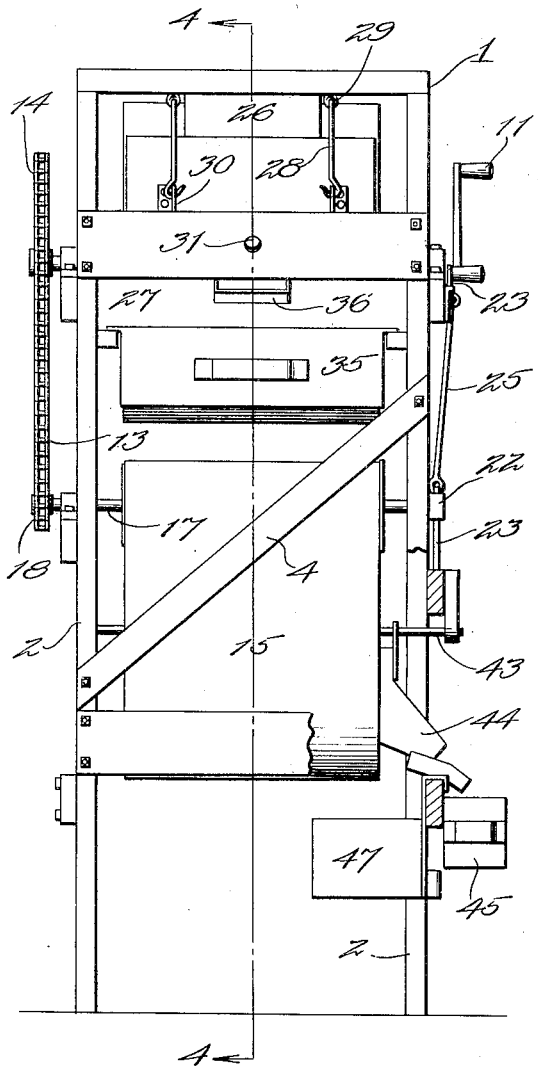
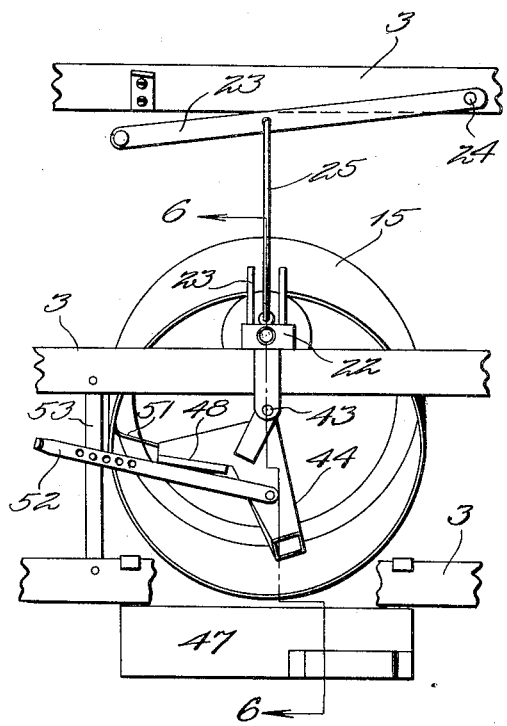
Joseph Volz
INVENTOR
BY Victor J. Evans
ATTORNEY
WITNESS: R. E. Wise

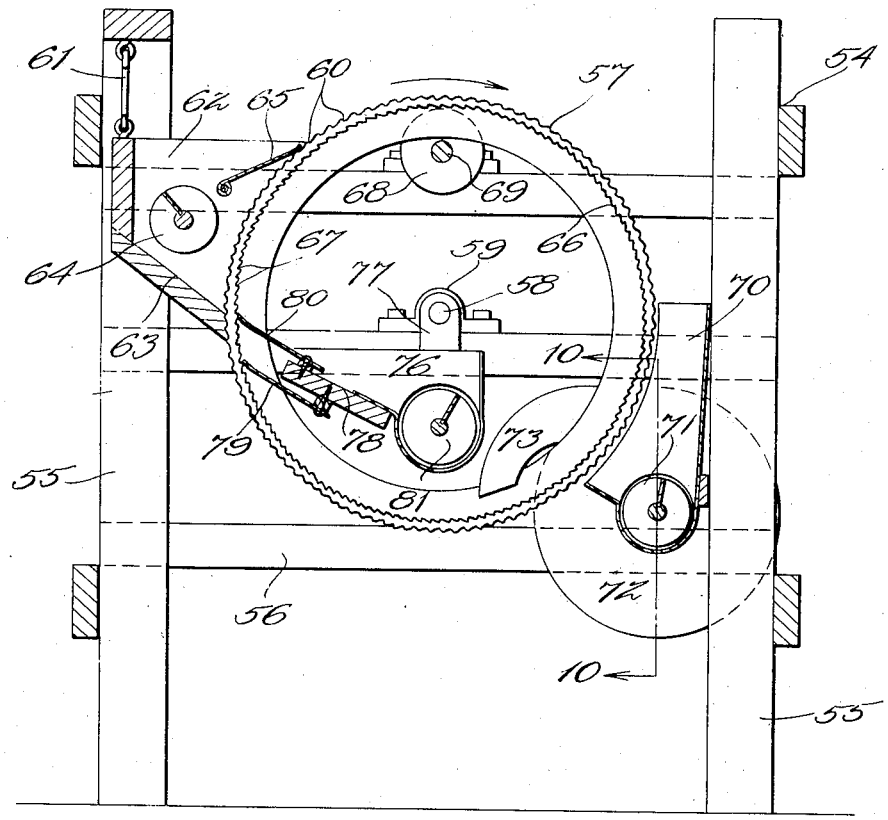

Patented June 18, 1929.

1,717,748

UNITED STATES PATENT OFFICE.

JOSEPH VOLZ, OF ELLIOTT, NORTH DAKOTA.

GRAIN SEPARATOR.

Application filed October 21, 1925. Serial No. 64,034.

This invention relates to apparatus for treating grain and has for its object the provision of a novel separator by means of which wild oats, cockles, and weed seeds of very many kinds may be separated from wheat or other grain so that the grain will be left free from the presence of the objectionable matter and fit for planting, milling or other subsequent treatment.

An important object is the provision of a device of this character so constructed and arranged that it may operate continuously and without the utilization of a blast or blower for the purpose of effecting any of the separation.

A more specific object is the provision of a machine of this character which takes advantage of the difference in sizes and weight of the grain and weed seeds or the like, so that when the mixture is carried about by a rotating drum the seeds of different weights will drop off at different times and be consequently separated from the grain.

Another object of the invention is to provide a machine of this type including one or more rotary drums having elements of a certain particular type arranged therein acting to have the various seeds fall upon them and also acting to conduct the seeds to conveyors, receptacles or the like by means of which they may be carried away.

The invention further contemplates the provision of an apparatus of this character which will be comparatively simple and inexpensive in manufacture, easy to operate and control, positive in action, efficient and durable in service, and a general improvement in the art.

With the above and other objects and advantages in view, the invention consists in the details of construction and the arrangement and combination of parts to be hereinafter more fully described and claimed, and illustrated in the accompanying drawings, in which:—

Figure 3 is a side elevation.

Figure 5 is a fragmentary elevation on a larger scale looking at one end of the device.

Figure 8 is a cross section taken on the line 8—8 of Figure 7.

Figure 9 is a detail view of a carrier or elevator member, and

Figure 10 is a detail sectional view showing a portion of a screw conveyor, used in the second form of the invention.

Figure 4:
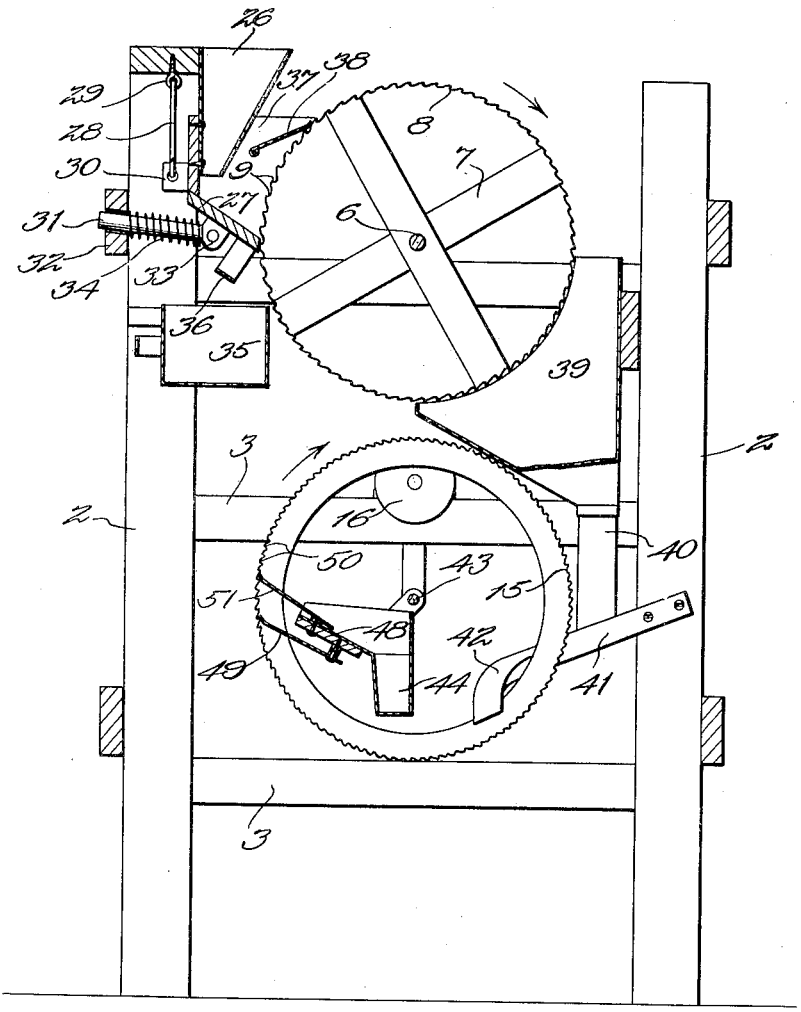
Figure 4 is a vertical cross section taken on the line 4—4 of Figure 3.
Figure 7:
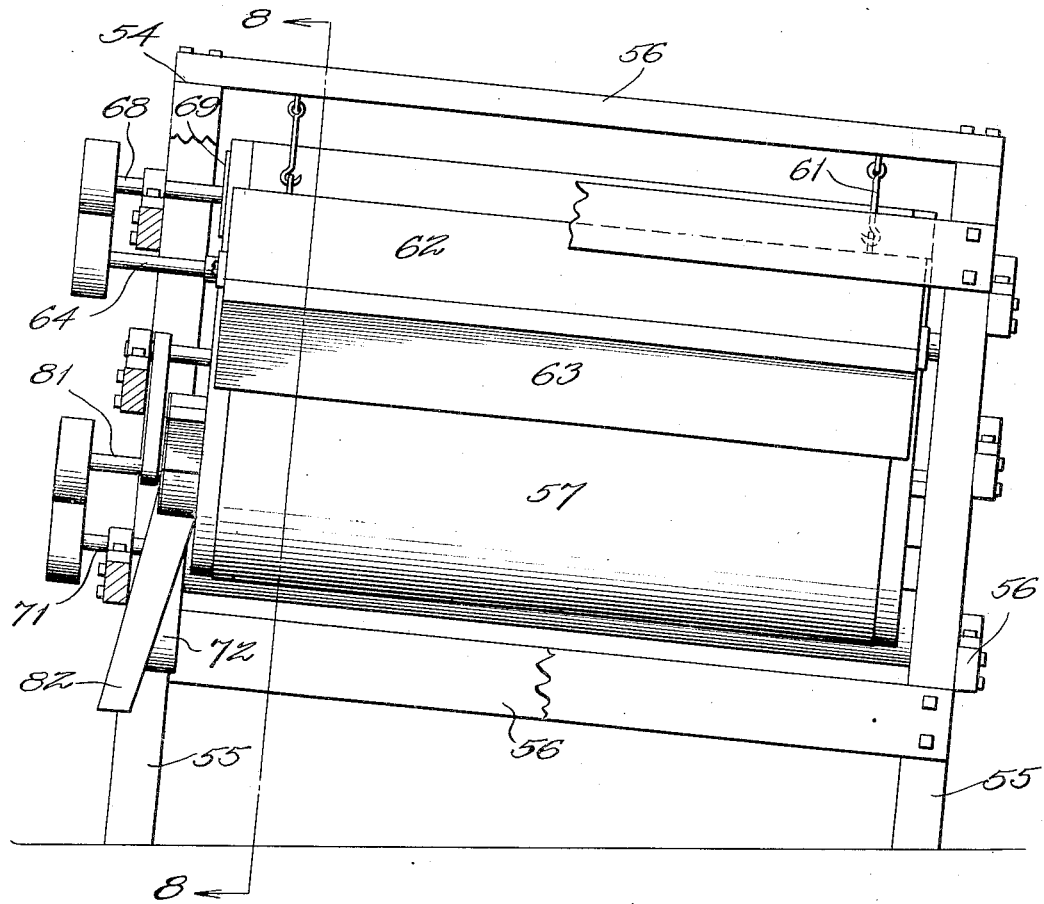
Figure 7 is a side elevation, partly in section, illustrating another form of the invention.

Referring more particularly to the drawings, I have shown the device as comprising a suitable frame designated generally by the numeral 1, this frame being constructed of wood or metal and consisting of any necessary or desired number of uprights 2, cross bars 3, and braces 4 arranged and connected in any preferred manner. Mounted upon the uppermost cross bars at the ends of the frame are suitable bearings 5 within which are journaled the end portions of a shaft 6 projecting from and through the spider like end portions 7 of a drum 8 which has its periphery formed with a plurality of shallow pockets 9 as clearly indicated in Figure 4. This drum is intended to be rotated and the means for effecting rotation may consist of a suitably journalled shaft 10 carrying a crank handle 11 for manual operation or equipped with any other means whereby power may be applied thereto. On the shaft 10 is provided a pulley 12 about which is engaged a belt 13 which in turn peripherally engages a pulley 14 on one end of the shaft 6. The belt 13 also engages another element to be described.

Located within the confines of the frame 1 and located below the drum 8 is a second drum 15 supported upon a longitudinally extending roller or upon a pair of rollers 16 carried by a shaft 17 on one end of which is a belt or sprocket 18 with which engages the belt or chain 13 above described. It will be observed that the member 13 has been referred to as a belt or chain and it is of course obvious that the members 12, 14 and 18 may be either pulleys or sprockets as preferred. Logically, gearing could be provided for effecting the driving if such is found desirable for any reason. The shaft 17 is peculiarly mounted inasmuch as one end is provided with a ball member 19 engaged within a bearing 20 on the frame, while the other end is similarly provided with a ball member 21 engaged within a bearing member 22 which is vertically slidable along the frame as upon guides 23.

Figure 1:
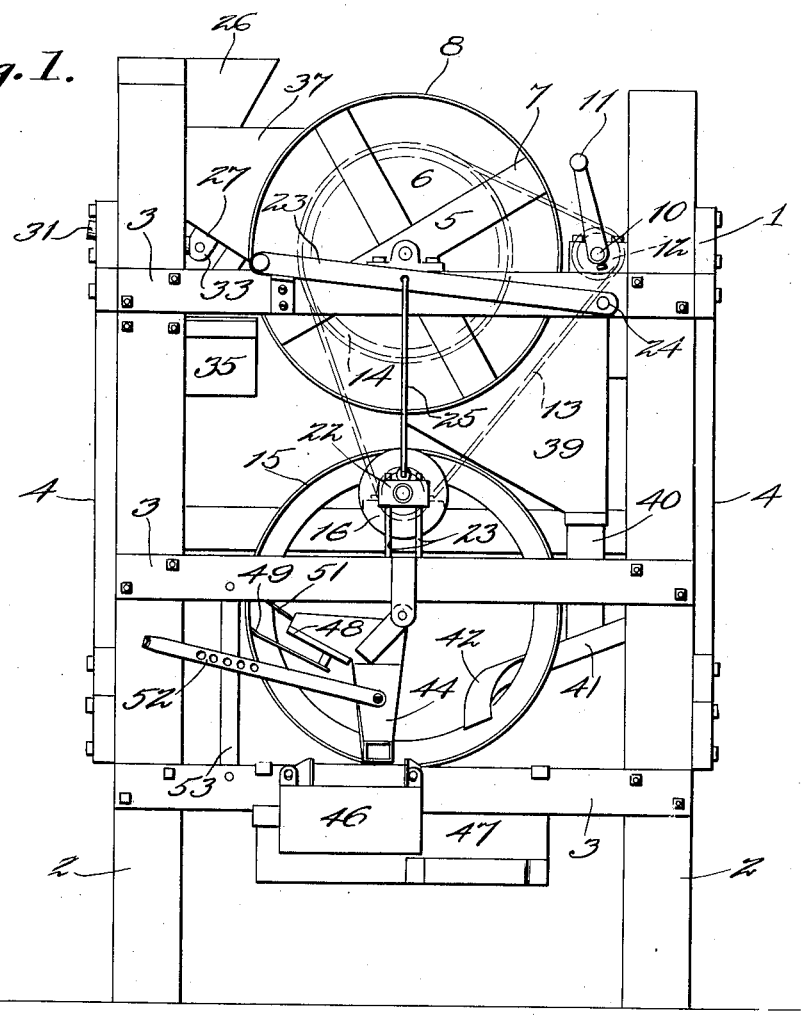
Figure 1 is an end elevation of one form of the device.
Figure 6:
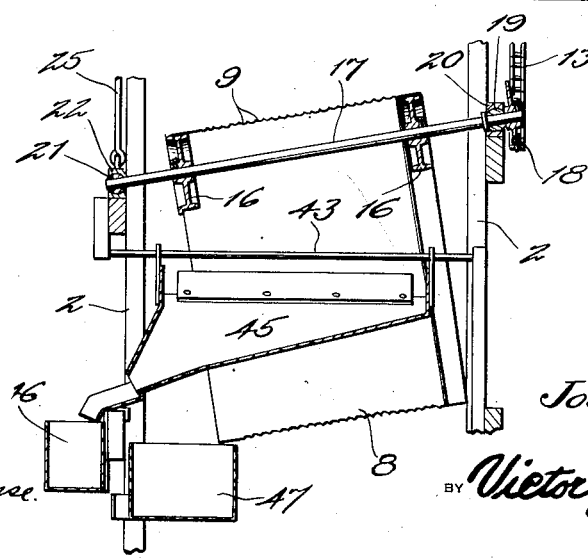
Figure 6 is a section taken on the line 6—6 of Figure 5.
Figure 2:
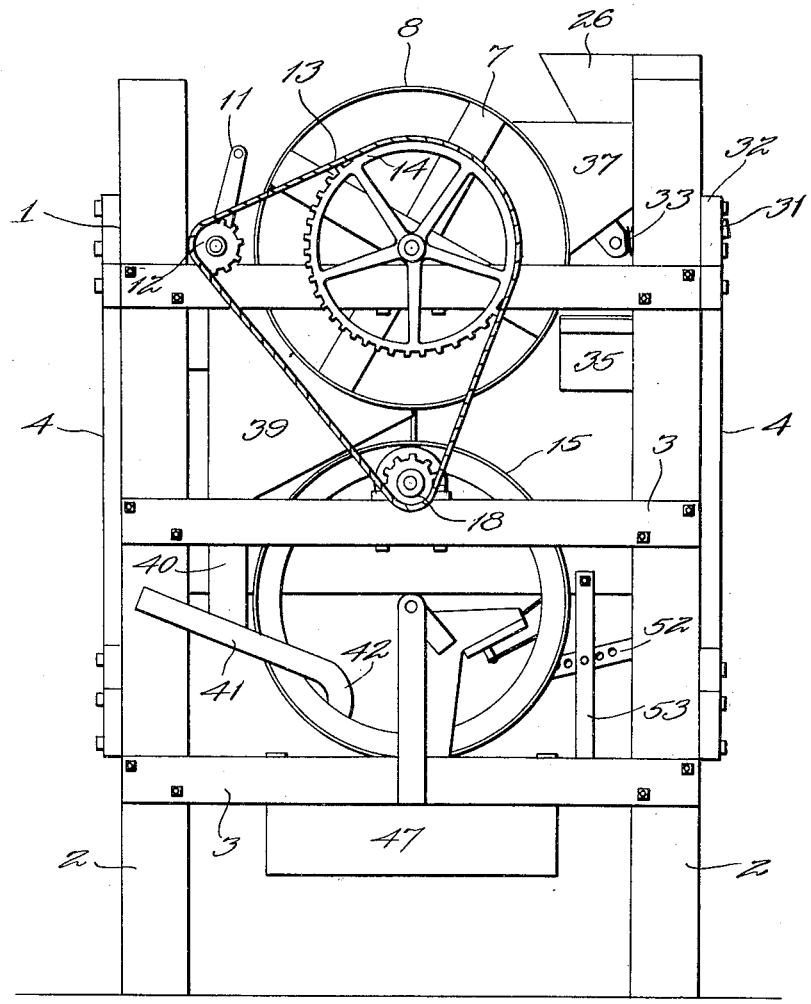
Figure 2 is an elevation of the opposite end.

The position of the slidable bearing 22 is governed by means of a lever 23 pivoted on the frame as shown at 24 and having connected therewith a rod or the like 25 which is in turn connected with the slidable member 22. By means of this lever 23 it will be apparent that the slidable bearing member 22 may be moved downwardly to tilt the shaft 17 as shown in Figure 6 for a purpose to be described.

Located at the upper portion of the frame is a hopper 26 secured to a guide board structure 27 of angular formation which extends close to the periphery of the drum 8. The hopper 26 is mounted in position by means of suitable hooks 28 carried by screw eyes 29 or the like at the top of the frame and detachably engaged with ears 30 on the guide board 27. The hopper 26 has its lower end terminating above the inclined lower portion of the guide board so that grain fed into the hopper may pass onto the guide board 27 and there-along toward the periphery of the drum 8. In order that the guide board 27 will be urged always towards the drum, use may be made of a rod 31 slidable through a guide member 32 on the frame and pivotally connected with a suitable apertured ear 33 on the underside of the guide board. A coil spring 34 surrounds the rod 31 and abuts against the ear 33 and also against the guide member 32. By this means it is clear that the guide board will be urged resiliently toward the periphery of the drum but that it may yield in case of necessity.

Detachably mounted upon the frame at a point below the lower edge of the guide board 27 is a suitable box-like receptacle 35 into which matter accumulating or remaining upon the guide board may be dropped by pulling the guide board downwardly and outwardly by means of a suitable handle 36 provided thereon, the spring 34 being, of course, compressed when such is done. The reason for this will be hereinafter made apparent. Secured to the end portions of or forming a part of the guide board are lateral wall members 37 which operate to prevent grain fed into the hopper and onto the guide board from dropping off at the ends of the drum. Suitably carried by the guide board or wall members 37 is a scraper or flap 38 which bears upon the periphery of the drum 8.

Suitably mounted at the side of the frame opposite that at which the hopper 26 and above described parts are located, is a receiving hopper 39 located partly beneath the upper drum 8 and above the lower drum 15.

At the lower end of the hopper 39 is a spout 40 leading into a chute 41 which is mounted upon the frame in inclined position and which has a laterally extending curved end 42 discharging into one end of the lower drum 15.

Extending transversely of the frame and longitudinally through the lower drum 15 is a supporting rod 43 from which is suspended a trough member 44 having an inclined bottom 45 leading to one side of the frame and discharging into a suitable receptacle 46. Mounted within the frame and below the lower drum 15 is a similar receptacle 47, the purpose of which will be hereinafter made apparent. The trough member 44 includes an inclined wall portion 48 beneath which is mounted a scraper member 49 bearing against the inner periphery of the lower drum 15, which inner periphery is formed with pockets 50. Carried by and mounted upon the top of the wall portion 48 of the trough member is a second scraper member 51 which likewise bears against the inner periphery of the lower drum 15.

In the operation of this form of the device, the wheat containing the matter to be separated therefrom is fed into the hopper 26 and will of course drop onto the guide board 27 and gravitate into and contact with the periphery of the rotating drum 8. The wheat and other seeds with the exception of large matter such as wild oats and the like will be gathered up by the pockets 9 and carried around by the drum 8 and dropped into the receiving hopper 39. The scraper member 38 bearing upon the periphery of the upper drum 8 will scrape off any seeds or other matter larger than wheat so that such undesired matter will accumulate upon the guide board 27 off which it may be dropped into the box 35 by pulling downwardly and outwardly upon the handle 36 to swing the guide board 27 away from the drum. The wheat and other matter carried around by the drum 8 will of course drop out of the pockets thereof into the receiving hopper 39 from whence it will pass through the spout 40 into the chute 41 and then into the lower portion of the lower drum 15. Owing to the fact that the lower drum is rotated by its engagement with the rollers 16, it is quite evident that the pocket on the interior will pick up the wheat and other seeds discharged from the chute 42 and carry them upwardly in the direction of the arrow in Figure 4. The pockets 50 in the lower drum are very shallow so that the wheat engaged therein and carried along upwardly thereby will, upon engaging the flap or scraper 49, be scraped off so that it will accumulate within the bottom portion of the lower drum. The cockle, buck wheat, wild peas and other undesirable seeds are carried through underneath the flap or scraper 49 and also underneath the flap or scraper 51, but upon reaching such a point that they are above the center line of the lower drum it is obvious that they will fall by gravity, out of the pocket onto the flap or scraper 51 and be conducted thereby along into the trough 44 and discharged therefrom into the box or receptacle 46. To effect removal of the clean wheat which has accumulated within the drum 15, it is merely necessary that the operator swing the lever 23 downwardly so that the bearing member 22 connected therewith will be moved downwardly, thus permitting the shaft 17 and drum 15 to tilt as shown in Figure 6, the wheat therein being discharged into the receptacle 47.

It may of course be necessary to adjust the position of the flap or scraper members 49 and 51, and to accomplish this I provide an elongated lever 52 suitably secured to the trough member 44 and adapted to be connected with a supporting member 53 on the frame at any desired position so that the angular positions of the flap or scraper members may be adjusted or varied to suit conditions.

In Figures 7 to 10 inclusive, I have illustrated a modified form of the invention in which use is made of concentric drums in contradistinction to the above described form in which the two drums are located one above the other. Referring to Figures 7 to 10 in detail, the numeral 54 designates a suitable supporting frame including any necessary number of uprights 55 and horizontal members 56. Journally mounted in the frame is an outer drum 57 supported by a shaft 58 engaged through suitable bearings 59. This drum is provided with pockets 60 and it is obvious that it may be rotated in any desired manner. Suspended, as by links or hooks 61 from the upper portion of the frame is a hopper 62 having an inclined bottom 63 corresponding to the above described angular guide board, which bottom has its free edge extending to a point adjacent the periphery of the drum 57. A screw conveyor 64 may be provided in the hopper 62 for conducting grain from the upper end thereof to the lower end so that it will be distributed throughout the length and fed to the drum. Mounted within the hopper is also a flap or scraper 65 bearing upon the periphery of the outer drum for the purpose of scraping off wild oats or any seeds or any other matter larger than wheat or the grain to be cleaned, which objectionable matter removed by the scraper will be discharged through an opening at the lower end of the hopper.

Located within the confines of the outer drum 57 is a somewhat similar drum 66 formed with pockets 67 and suspended upon rollers 68 carried by a suitably driven shaft 69 in a manner analogous to the first described form. Attention is directed to the fact that in this modification the drums are arranged with their longitudinal axes in inclined relation so that the drum will be higher at one end than at the other so that the seeds will gravitate toward the lower end.

Mounted within the frame at the side thereof opposite that at which the hopper 62 is located is a receiving hopper 70 provided in its bottom with a screw conveyor 71 so that the wheat and other seeds carried over past the scraper 65 by the drum 57 and discharging into the hopper 70 and naturally gravitating to the lower end thereof will be carried up to the higher end of the machine and deposited into a casing 72 from which leads a spout 73 discharging into the higher end of the inner drum 66. Within the casing 72, the shaft 74 of the screw conveyor 71 carries a species of paddle wheel 75, the blades of which will engage the grain within the casing 72 and lift it and discharge it through the outlet spout 73 so that it will be forced to enter the inner drum 66.

Located within the inner drum and extending longitudinally thereof is a trough member 76 having ears 77 or the like suspended from the shaft 58. This trough member has an inclined laterally extending portion 78 upon the underside of which is mounted a flap or scraper 79 and on the top of which is mounted a second flap or scraper 80. Both of these flaps or scrapers bear against the inner periphery of the inner drum. Attention is directed to the fact that the pockets 67 in the inner drum are of proper size to hold wheat or other grain to be cleaned and it is obvious that the wheat mixed with undesirable seeds fed into the inner drum will pass upwardly as the drum is rotated, the larger grains of wheat remaining in the bottom portion of the drum and the smaller grain carried upwardly being scraped off by the lowermost flap or scraper member 79. Cockle, buckwheat, wild peas and other objectionable seeds remaining in the pocket after passing beneath the flap 79 will still remain in the pocket after passing the flap 80 but upon reaching a point above the center line of the drums they will drop, gravitationally, onto the flap or scraper 80 into the trough member 76. Operating within the trough member 76 is a screw conveyor 81 which extends to the higher end of the drums and which will carry out and discharge into a spout 82 all of the objectionable seeds collected within the trough member 76. The wheat, separated from the objectionable seeds, will of course drop, by gravity, from the lower end of the inner drum into any suitable receptacle which may be provided.

From the foregoing description and a study of the drawing, it will be apparent that I have thus provided a very simple machine by means of which wheat or other grain may be effectually cleaned or separated from weeds and other undesirable seeds, the cleaned grain being consequently in proper condition fit for use in planting, in milling, or for any other purpose. It is believed that the construction, operation and advantages will be readily apparent to one skilled in the art without further explanation.

While I have shown and described the preferred embodiment of the invention, it should be understood that I reserve the right to make such changes in the form, construction and arrangement of parts as will not depart from the spirit of the invention or the scope of the subjoined claims.

Having thus described the invention, I claim:—

1. In a device of the character described, the combination of a pair of concentrically arranged inclined drums communicating one with the other at one end, a flexibly supported hopper located against the outer drum and carrying scraper means bearing upon the periphery, a feed conveyor within said hopper, a pivotally suspended trough within the inner drum, a conveyor located within the trough, a member carried by the trough, a pair of scrapers carried by said member and bearing against the inner periphery of the inner drum, the outer drum having its periphery provided with pockets and the inner drum having its inner periphery provided with pockets adapted to collect grain kernels, and a blower receiving material from said outer drum and discharging the same into the lower end of the inner drum.

2. In a grain separator, a pair of concentric drums mounted in inclined position and located one within the other and in communicating relation at one end, a flexibly suspended hopper located at one side of the outer drum and equipped with a scraper bearing against the periphery thereof, a receiving trough located exteriorly of the outer drum at the opposite side thereof at which said hopper is located to receive grain therefrom, the outer drum having its periphery provided with pockets adapted to carry undesirable seeds from the hopper and discharge them into said trough, a conveyor located within said trough, a blower mounted at the end of the conveyor and having a discharge spout extending into the inner drum whereby seeds received within said trough will be discharged into the inner drum, a trough located within the inner drum and carrying scraper means bearing against the pocketed inner periphery thereof.

3. In a machine of the character described, the combination of a supporting frame, a pair of drums mounted therein one within the other and arranged in inclined position and concentric relation, a hopper suspended at one side of the frame in proximity to the outer drum and having a scraper bearing upon the outer periphery thereof, means located within the frame at the opposite side thereof from said hopper for receiving grain carried around by the outer drum, means for discharging said grain into the inner drum, a trough located within the inner drum and carrying a scraper for receiving the grain carried around by the inner drum, and discharge means associated with said second named trough.

In testimony whereof I affix my signature.

JOSEPH VOLZ.